United States Patent
Agarwal et al.

(10) Patent No.: US 8,996,996 B2
(45) Date of Patent: *Mar. 31, 2015

(54) DYNAMIC REAL-TIME PLAYBACK

(71) Applicant: Apple Inc., Cupertino, CA (US)

(72) Inventors: Sachin Agarwal, San Francisco, CA (US); Giovanni Agnoli, San Mateo, CA (US); Brian Everett Meaney, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,908

(22) Filed: Jan. 29, 2014

(65) Prior Publication Data

US 2014/0147098 A1    May 29, 2014

Related U.S. Application Data

(63) Continuation of application No. 12/652,692, filed on Jan. 5, 2010, now Pat. No. 8,645,834, which is a continuation of application No. 11/107,397, filed on Apr. 15, 2005, now Pat. No. 7,669,130.

(51) Int. Cl.
  *G11B 27/34* (2006.01)
  *G11B 27/02* (2006.01)
  *G11B 27/034* (2006.01)

(52) U.S. Cl.
  CPC .............. *G11B 27/02* (2013.01); *G11B 27/034* (2013.01); *G11B 27/34* (2013.01)
  USPC ........................................................ 715/723

(58) Field of Classification Search
  CPC . H04N 5/44543; G11B 27/34; G11B 2220/90
  See application file for complete search history.

(56) References Cited

U.S. PATENT DOCUMENTS

| | | | |
|---|---|---|---|
| 5,033,105 A | 7/1991 | Atkinson | |
| 5,046,119 A | 9/1991 | Hoffert et al. | |
| 5,212,742 A | 5/1993 | Normile et al. | |
| 5,237,397 A | 8/1993 | Mighdoll et al. | |
| 5,241,658 A | 8/1993 | Masterson et al. | |
| 5,267,334 A | 11/1993 | Normille | |
| 5,333,062 A * | 7/1994 | Hara et al. | 358/437 |
| 5,335,299 A | 8/1994 | Atkinson | |
| 5,438,423 A | 8/1995 | Lynch et al. | |
| 5,461,679 A | 10/1995 | Normile et al. | |
| 5,537,530 A * | 7/1996 | Edgar et al. | 715/723 |
| 5,598,213 A | 1/1997 | Chung et al. | |

(Continued)

OTHER PUBLICATIONS

"Annex A—Video Constraints", [online]. [retrieved on Mar. 4, 2003]. Retrieved from the Internet: <http://www.bretl.com/mpeghtml/A53A.HTM>, (Mar. 25, 2005), 1 pg.

(Continued)

*Primary Examiner* — Phenuel Salomon
(74) *Attorney, Agent, or Firm* — Schwegman Lundberg & Woessner, P.A.

(57) ABSTRACT

Systems and methods for previewing edited video. In general, in one implementation, a method includes generating a video sequence from a plurality of video segments, identifying an inability to output at least one video segment in the video sequence in substantially real time; and adjusting an output level associated with the at least one video segment to enable the at least one video segment to be output in substantially real time. The output level may include a video quality or a frame rate.

20 Claims, 9 Drawing Sheets

(56) References Cited

U.S. PATENT DOCUMENTS

| | | | |
|---|---|---|---|
| 5,604,857 A * | 2/1997 | Walmsley | 345/473 |
| 5,732,184 A * | 3/1998 | Chao et al. | 386/282 |
| 5,790,196 A | 8/1998 | Sun et al. | |
| 5,930,445 A | 7/1999 | Peters et al. | |
| 5,969,764 A | 10/1999 | Sun et al. | |
| 5,982,979 A * | 11/1999 | Omata et al. | 386/243 |
| 6,016,360 A | 1/2000 | Nguyen et al. | |
| 6,091,777 A | 7/2000 | Guetz et al. | |
| 6,154,542 A | 11/2000 | Crandall | |
| 6,192,183 B1 * | 2/2001 | Taniguchi et al. | 386/282 |
| 6,573,846 B1 | 6/2003 | Trivedi et al. | |
| 6,650,708 B1 | 11/2003 | Ohgose | |
| 6,686,970 B1 * | 2/2004 | Windle | 348/584 |
| 6,728,315 B2 | 4/2004 | Haskell et al. | |
| 6,781,529 B1 | 8/2004 | Lin et al. | |
| 6,876,703 B2 | 4/2005 | Ismaeil et al. | |
| 6,915,018 B2 | 7/2005 | Tajime | |
| 6,961,378 B1 | 11/2005 | Greenfield et al. | |
| 6,993,604 B2 | 1/2006 | Dixon | |
| 7,346,106 B1 | 3/2008 | Jiang et al. | |
| 7,434,155 B2 | 10/2008 | Lee | |
| 7,483,487 B2 | 1/2009 | Liu et al. | |
| 7,669,130 B2 | 2/2010 | Agarwal et al. | |
| 7,746,927 B1 | 6/2010 | Hamilton et al. | |
| 8,645,834 B2 | 2/2014 | Agarwal et al. | |
| 2001/0040592 A1 | 11/2001 | Foreman et al. | |
| 2002/0136294 A1 | 9/2002 | Culbert | |
| 2003/0079038 A1 | 4/2003 | Robbin | |
| 2003/0169285 A1 | 9/2003 | Smith et al. | |
| 2004/0095377 A1 | 5/2004 | Salandro | |
| 2004/0224638 A1 | 11/2004 | Fadell et al. | |
| 2004/0252397 A1 | 12/2004 | Hodge et al. | |
| 2004/0255338 A1 | 12/2004 | Agnoli et al. | |
| 2005/0018083 A1 | 1/2005 | Ryou | |
| 2005/0041807 A1 | 2/2005 | Lee | |
| 2005/0207734 A1 * | 9/2005 | Howell et al. | 386/68 |
| 2005/0213656 A1 * | 9/2005 | Liu et al. | 375/240.01 |
| 2006/0104345 A1 * | 5/2006 | Millar et al. | 375/240.01 |
| 2010/0178024 A1 | 7/2010 | Agarwal et al. | |

OTHER PUBLICATIONS

"Annex B—Audio System", [online]. [retrieved on Mar. 4, 2003]. Retrieved from the Internet: <http://www.bretl.com/mpeghtml/A53B.HTM>, (Mar. 25, 2005), 1 pg.

"Annex C—Multiplex and Transport", [online]. [retrieved on Mar. 4, 2003]. Retrieved from the Internet: <http://www.bretl.com/mpeghtml/A53C.HTM>, (Mar. 25, 2005), 1 pg.

"Annex D—RF/Transmission System", [online]. [retrieved on Mar. 4, 2003]. Retrieved from the Internet: <http://www.bretl.com/mpeghtml/A53D.HTM>, (Mar. 25, 2005), 1 pg.

"U.S. Appl. No. 11/107,397, Advisory Action mailed Jan. 27, 2009", 3 pgs.

"U.S. Appl. No. 11/107,397, Applicant's Summary of Examiner Interview filed May 28, 2009", 1 pg.

"U.S. Appl. No. 11/107,397, Examiner Interview Summary mailed Apr. 29, 2009", 2 pgs.

"U.S. Appl. No. 11/107,397, Final Office Action mailed Oct. 7, 2008", 20 pgs.

"U.S. Appl. No. 11/107,397, Non Final Office Action mailed Apr. 4, 2008", 19 pgs.

"U.S. Appl. No. 11/107,397, Non Final Office Action mailed May 15, 2009", 19 pgs.

"U.S. Appl. No. 11/107,397, Notice of Allowance mailed Oct. 6, 2009", 8 pgs.

"U.S. Appl. No. 11/107,397, Response filed Feb. 25, 2009 to Advisory Action mailed Jan. 27, 2009", 17 pgs.

"U.S. Appl. No. 11/107,397, Response filed Jul. 7, 2008 to Non Final Office Action mailed Apr. 4, 2008", 22 pgs.

"U.S. Appl. No. 11/107,397, Response filed Aug. 17, 2009 to Non Final Office Action mailed May 15, 2009", 12 pgs.

"U.S. Appl. No. 11/107,397, Response filed Dec. 8, 2008 to Final Office Action mailed Oct. 7, 2008", 19 pgs.

"U.S. Appl. No. 12/652,692, Amendment filed Sep. 23, 2011 in reply to Non Final Office Action mailed May 26, 2011", 22 pgs.

"U.S. Appl. No. 12/652,692, Final Office Action mailed Dec. 14, 2011", 26 pgs.

"U.S. Appl. No. 12/652,692, Non Final Office Action mailed Mar. 12, 2013", 16 pgs.

"U.S. Appl. No. 12/652,692, Non Final Office Action mailed May 26, 2011", 23 pgs.

"U.S. Appl. No. 12/652,692, Notice of Allowance mailed Sep. 27, 2013", 15 pgs.

"U.S. Appl. No. 12/652,692, Response filed Mar. 14, 2012 to Final Office Action mailed Dec. 14, 2011", 18 pgs.

"U.S. Appl. No. 12/652,692, Response filed Jul. 12, 2013 to Non-Final Office Action mailed Mar. 12, 2013", 13 pgs.

"ATSC Doc A/53 Constraints on MPEG", [Online]. [retrieved on Mar. 4, 2013]. Retrieved from Internet: <http://www.bretl.com/mpeghtml/A53spec.HTM>, (Mar. 25, 2005), 1 pg.

"ATSC Program and System Information Protocol (PSIP)", [online]. [retrieved on Mar. 4, 2013]. Retrieved from the Internet: <http://www.bretl.com/mpeghtml/ATSCPSIP.HTM>, (Mar. 25, 2005), 1 pg.

"ATSC Standards", [online]. [retrieved on Mar. 4, 2013]. Retrieved From Internet: <http://www.bretl.com/mpeghtml/ATSCstds.HTM>, (Mar. 25, 2005), 2 pgs.

"Background", [online]. [retrieved on Mar. 4, 2013]. Retrieved from the Internet: <http:/ /www.bretl.com/mpeghtml/vcback.HTM>, (Mar. 25, 2005), 1 pg.

"Block", [online]. [retrieved on Mar. 4, 2013]. Retrieved from the Internet: <http://www.bretl.com/mpeghtml/block.HTM>, (Mar. 25, 2005), 1 pg.

"Buffer Synchronization and Startup", [online]. [retrieved on Mar. 4, 2013]. Retrieved from the Internet: <http://www.bretl.com/mpeghtml/bufsync.HTM>, (Mar. 25, 2005), 1 pg.

"Compression tools", [online]. [retrieved on Mar. 4, 2013]. Retrieved from the Internet: <http://www.bretl.com/mpeghtml/VCtools.HTM>, (Mar. 25, 2005), 1 pg.

"Constant Bit Rate Operation", [online]. [retrieved on Mar. 4, 2013]. Retrieved from the Internet: <http://www.bretl.com/mpeghtml/conBR.HTM>, (Mar. 25, 2005), 1 pg.

"Decoder Buffer Requirements", [online]. [retrieved on Mar. 4, 2013]. Retrieved from the Internet: <http://www.bretl.com/mpeghtml/bufreq.HTM>, (Mar. 25, 2005), 2 pgs.

"Decoder STC Synchronization", [online]. [retrieved on Mar. 4, 2013]. Retrieved from the Internet: <http://www.bretl.com/mpeghtml/STCsync.HTM>, (Mar. 25, 2005), 1 pg.

"Discrete Cosine Transform", [online]. [retrieved on Mar. 4, 2013]. Retrieved from the Internet: <http://www.bretl.com/mpeghtml/DCxfrm.HTM>, (Mar. 25, 2005), 2 pgs.

"DTS—Decode Time Stamp", [online]. [retrieved on Mar. 4, 2013]. Retrieved from the Internet: <http://www.bretl.com/mpeghtml/DTS.HTM>, (Mar. 25, 2005), 1 pg.

"Example—one-dimensional lossy system", [online]. [retrieved on Mar. 2, 2013]. Retrieved from the Internet: <http://www.bretl.com/mpeghtml/exam1d.HTM>, (Mar. 25, 2005), 1 pg.

"Example: Coding based on clustering of pixel values", [online]. [retrieved on Mar. 2, 2013]. Retrieved from the Internet: <http://www.bretl.com/mpeghtml/cluster.HTM>, (Mar. 25, 2005), 1 pg.

"Field DCT Coding and Frame DCT Coding", [online]. [retrieved on Mar. 4, 2013]. Retrieved from the Internet: <http://www.bretl.com/mpeghtml/fldfrm.HTM>, (Mar. 25, 2005), 2 pgs.

"Frame-Differential Coding", [online]. [retrieved on Mar. 2, 2013]. Retrieved from the Internet: <http://www.bretl.com/mpeghtml/framedif.HTM>, (Mar. 25, 2005), 1 pg.

"Frames, Fields, Pictures (I, P, B)", [online]. [retrieved on Mar. 2, 2013]. Retrieved from the Internet: <http://www.bretl.com/mpeghtml/pixtypes.HTM>, (Mar. 25, 2005), 2 pgs.

"Glossary", [online] [retrieved on Mar. 4, 2013]. Retrieved from the Internet: <http://www.bretl.com/mpeghtml/gloss.htm>, (Mar. 25, 2005), 4 pgs.

"Group of Pictures (GOP)", [online] [retrieved on Mar. 4, 2013]. Retrieved from the Internet: <http://www.bretl.com/mpeghtml/GOP.HTM>, (Mar. 25, 2005), 1 pg.

(56) References Cited

OTHER PUBLICATIONS

"Huffman/Run-Level Coding", [online]. [retrieved on Mar. 4, 2013]. Retrieved from the Internet: <http://www.bretl.com/mpeghtml/huffRL.HTM>, (Mar. 25, 2005), 2 pgs.

"I P B Picture Reordering", [online]. [retrieved on Mar. 2, 2013]. Retrieved from the Internet: <http://www.bretl.com/mpeghtml/reorder.HTM>, (Mar. 25, 2005), 1 pg.

"Introduction to MPEG 2 Video Compression", [online]. [retrieved on Mar. 2, 2013]. Retrieved from Internet: <http://www.bretl.com/mpeghtml/mpeg2vc1.HTM>, (Mar. 25, 2005), 1 pg.

"Loop Characteristics", [online]. [retrieved on Mar. 4, 2013]. Retrieved from the Internet: <http://www.bretl.com/mpeghtml/loopchar.HTM>, (Mar. 25, 2005), 4 pgs.

"Lossy Coding", [online]. [retrieved on Mar. 2, 2013]. Retrieved from Internet: <http://www.bretl.com/mpeghtml/lossycod.HTM>, (Mar. 25, 2005), 2 pgs.

"Lossy Coding Requirements", [online]. [retrieved on Mar. 2, 2013]. Retrieved from the Internet: <http://www.bretl.com/mpeghtml/lossyreq.HTM>, (Mar. 25, 2005), 1 pg.

"Low Delay Mode", [online]. [retrieved on Mar. 4, 2013]. Retrieved from the Internet: <http://www.bretl.com/mpeghtml/lodelay.HTM>, (Mar. 25, 2005), 1 pg.

"Macroblock", [online]. [retrieved on Mar. 4, 2013]. Retrieved from the Internet: <http://www.bretl.com/mpeghtml/macroblk.HTM>, (Mar. 25, 2005), 1 pg.

"Masking", [online]. [retrieved on Mar. 2, 2013]. Retrieved from the Internet: <http://www.bretl.com/mpeghtml/masking.HTM>, (Mar. 25, 2005), 1 pg.

"Motion Compensated Prediction", [online]. [retrieved on Mar. 2, 2013]. Retrieved from the Internet: <http://www.bretl.com/mpeghtml/motcomp.HTM>, (Mar. 25, 2005), 1 pg.

"MPEG 2 Data Transport", [online]. [retrieved on Mar. 4, 2013]. Retrieved from the Internet: <http://www.bretl.com/mpeghtml/dataxprt.HTM>, (Mar. 25, 2005), 1 pg.

"MPEG 2 Prediction", [online]. [retrieved on Mar. 2, 2013]. Retrieved from the Internet: <http://www.bretl.com/mpeghtml/mpredic.HTM>, (Mar. 25, 2005), 2 pgs.

"MPEG 2 Quantization", [online]. [retrieved on Mar. 2, 2013]. Retrieved from the Internet: <http://www.bretl.com/mpeghtml/quantiz.HTM>, (Mar. 25, 2005), 1 pg.

"MPEG 2 Video Data Structures", [online]. [retrieved on Mar. 4, 2013]. Retrieved from the Internet: <http://www.bretl.com/mpeghtml/vidstruc.HTM>, (Mar. 25, 2005), 1 pg.

"MPEG Coder/Decoder Diagram", [online]. [retrieved on Mar. 2, 2013]. Retrieved from the Internet: <http://www.bretl.com/mpeghtml/codecdial.HTM>, (Mar. 25, 2005), 2 pgs.

"MPEG Program Specific Information (PSI)", [online]. [retrieved on Mar. 4, 2013]. Retrieved from the Internet <http://www.bretl.com/mpeghtml/mpegpsi.HTM>, (Mar. 25, 2005), 1 pg.

"MPEG Standards", [online] [retrieved on Mar. 4, 2013]. Retrieved from the Internet: <http://www.bretl.com/mpeghtml/MPEGstds.HTM>, (Mar. 25, 2005), 1 pg.

"MPEG video compression technique", [online]. [retrieved on Mar. 4, 2013]. Retrieved from the Internet: <http://rnvs.informatik.tuchernnitz.de/-jan/MPEG/HTML/mpeg_tech.html>, (Mar. 25, 2005), 8 pgs.

"Multiplexed Programs", [online]. [retrieved on Mar. 4, 2013]. Retrieved from Internet: <http://www.bretl.com/mpeghtml/mpxprog.HTM>, (Mar. 25, 2005), 1 pg.

"PCR—Program Clock Reference", [online]. [retrieved on Mar. 4, 2013]. Retrieved from Internet: <http://www.bretl.com/mpeghtml/PCR.HTM>, (Mar. 25, 2005), 1 pg.

"PES Packets and Elementary Streams", [online] [retrieved Mar. 4, 2013]. Retrieved From Internet: <http://www.bretl.com/mpeghtml/pespckt.HTM>, (Mar. 25, 2005), 2 pgs.

"Picture", [online] [retrieved on Mar. 4, 2013]. Retrieved From Internet: <http://www.bretl.com/mpeghtml/picture.HTM>, (Mar. 25, 2005), 2 pgs.

"Pixel", [online]. [retrieved on Mar. 4, 2013]. Retrieved From Internet: <http://www.bretl.com/mpeghtml/index118.HTM>, (Mar. 25, 2005), 1 pg.

"Pixel Positioning", [online]. [retrieved on Mar. 2, 2013]. Retrieved from the Internet: <http://www.bretl.com/mpeghtml/pixpos.HTM>, (Mar. 25, 2005), 2 pgs.

"Prediction", [online]. [retrieved on Mar. 2, 2013]. Retrieved from the Internet: <http://www.bretl.com/mpeghtml/predic.HTM>, (Mar. 25, 2005), 1 pg.

"Profiles and Levels", [online]. [retrieved on Mar. 2, 2013]. Retrieved from the Internet: <http://www.bretl.com/mpeghtml/profiles.HTM>, (Mar. 25, 2005), 2 pgs.

"PTS—Presentation Time Stamp", [online]. [retrieved on Mar. 4, 2013]. Retrieved from the Internet: <http://www.bretl.com/mpeghtml/PTS.HTM>, (Mar. 25, 2005), 1 pg.

"Run-Level Coding", [online]. [retrieved on Mar. 2, 2013]. Retrieved from Internet: <http://www.bretl.com/mpeghtml/runlevel.HTM>, (Mar. 25, 2005), 1 pg.

"SCR—System Clock Reference", [online]. [retrieved on Mar. 4, 2013]. Retrieved from the Internet: <http://www.bretl.com/mpeghtml/SCR.HTM>, (Mar. 25, 2005), 1 pg.

"Sequence", [online]. [retrieved on Mar. 4, 2013]. Retrieved from the Internet: <http://www.bretl.com/mpeghtml/sequence.HTM>, (Mar. 25, 2005), 1 pg.

"Simple Differential Predictive Coding", [online]. [retrieved on Mar. 2, 2013]. Retrieved from the Internet: <http://www.bretl.com/mpeghtml/simpdiff.HTM>, (Mar. 25, 2005), 1 pg.

"Slice", [online] [retrieved on Mar. 4, 2013]. Retrieved from the Internet: <http://www.bretl.com/mpeghtml/slice.HTM>, (Mar. 25, 2005), 1 pg.

"Standards", [online] [retrieved on Mar. 4, 2013]. Retrieved From Internet: <http://www.bretl.com/mpeghtml/stds.HTM>, (Mar. 25, 2005), 1 pg.

"Startup", [online]. [retrieved on Mar. 4, 2013]. Retrieved from the Internet: <http://www.bretl.com/mpeghtml/startbuf.HTM>, (Mar. 25, 2005), 1 pg.

"STC—System Time Clock", [online]. [retrieved on Mar. 4, 2013]. Retrieved from the Internet: <http://www.bretl.com/mpeghtml/STC.HTM>, (Mar. 25, 2005), 1 pg.

"Synchronization Loop Model", [online]. [retrieved on Mar. 4, 2013]. Retrieved from the Internet: <http://www.bretl.com/mpeghtml/syncloop.HTM>, (Mar. 25, 2005), 2 pgs.

"Timing and Buffer Control", [online]. [retrieved on Mar. 4, 2013]. Retrieved from Internet: <http://www.bretl.com/mpeghtml/timebuf.HTM>, (Mar. 25, 2005), 1 pg.

"Timing Model", [online]. [retrieved on Mar. 4, 2013]. Retrieved from the Internet: <http://www.bretl.com/mpeghtml/timemdl.HTM>, (Mar. 25, 2005), 2 pgs.

"Timing Model Diagram", [online]. [retrieved on Mar. 4, 2013]. Retrieved from the Internet: <http://www.bretl.com/mpeghtml/timediag.HTM>, (Mar. 25, 2005), 1 pg.

"Transform Coding", [online]. [retrieved on Mar. 2, 2013]. Retrieved from the Internet: <http://www.bretl.com/mpeghtml/xfrmcode.HTM>, (Mar. 25, 2005), 1 pg.

"Transport Adaptation Field", [Online]. [retrieved on Mar. 4, 2013]. Retrieved from Internet: <http://www.bretl.com/mpeghtml/adapfld.HTM>, (Mar. 25, 2005), 1 pg.

"Transport Header", [online]. [retrieved on Mar. 4, 2013]. Retrieved from the Internet: <http://www.bretl.com/mpeghtml/xprthdr.HTM>, (Mar. 25, 2005), 1 pg.

"Transport Packet Diagram", [online]. [retrieved on Mar. 4, 2013]. Retrieved from Internet: <http://www.bretl.com/mpeghtml/pktdiag.HTM>, (Mar. 25, 2005), 1 pg.

"Transport Packets", [online]. [retrieved on Mar. 4, 2013]. Retrieved from Internet: <http://www.bretl.com/mpeghtml/xprtpkt.HTM>, (Mar. 25, 2005), 1 pg.

"Transport Payload", [online]. [retrieved on Mar. 4, 2013]. Retrieved from Internet: <http://www.bretl.com/mpeghtml/payload.HTM>, (Mar. 25, 2005), 1 pg.

"Unpredictable Information", [Online]. [retrieved on Mar. 2, 2013]. Retrieved from Internet: <http://www.bretl.com/mpeghtml/unpredic.HMT>, (Mar. 25, 2005), 1 pg.

(56) References Cited

OTHER PUBLICATIONS

"Variable Bit Rate Operation", [online]. [retrieved on Mar. 4, 2013]. Retrieved from Internet: <http://www.bretl.com/mpeghtml/VarBRr.HTM>, (Mar. 25, 2005), 1 pg.

"Variable Quantization", [online]. [retrieved on Mar. 2, 2013]. Retrieved from Internet: <http://www.bretl.com/mpeghtml/Varquant.HTM>, (Mar. 25, 2005), 1 pg.

"VBV—Video Buffering Verifier", [online]. [retrieved on Mar. 4, 2013]. Retrieved from Internet: <http://www.bretl.com/mpeghtml/VBV.HTM>, (Mar. 25, 2005), 1 pg.

"Zig-Zag Scanning Patterns", [online]. [retrieved on Mar. 4, 2013]. Retrieved from Internet: <http://www.bretl.com/mpeghtml/zigzag.HTM>, (Mar. 25, 2005), 1-2.

Bretl, Wayne E., et al., "MPEG2 Tutorial, Introduction and Contents", Copyright 1999, [online]. [retrieved on Mar. 4, 2013]. Retrieved from the Internet: <http://www.bretl.com/mpeghtml/MPEGindex.htm>, (Jan. 15, 2000), 1-4.

Hamilton, Eric, et al., "Robust Single-Pass Variable Bit Rate Encoding", U.S. Appl. No. 10/811,427, filed Mar. 26, 2004, 1-38.

Fogg, Chad, "MPEG-2 FAQ", [online]. Retrieved from the Internet: <http://bmrc.berkeley.edu/research/mpeg/faq/mpeg2-v38/faq_v38.html>, (Apr. 2, 1996), 1-46.

Tudor, P. N., "MPEG-2 Video Compression", [online]. [retrieved on Mar. 4, 2013]. Retrieved from the Internet: <http://www.bbc.co.uk/rd/pubs/papers/paper_14/paper_14.shtml>, (Dec. 1995), 1-15.

Jiang, Wenqing, et al., "Robust Multi-Pass Variable Bit Rate Encoding", U.S. Appl. No. 10/751,345, filed Dec. 30, 2003, 1-39.

* cited by examiner

DYNAMIC REAL-TIME PLAYBACK

CROSS-REFERENCE TO RELATED APPLICATION

This application is a continuation of U.S. application Ser. No. 12/652,692, filed Jan. 5, 2010, which is a continuation of U.S. application Ser. No. 11/107,397, filed Apr. 15, 2005 entitled "Dynamic Real-Time Playback", now issued as U.S. Pat. No. 7,669,130, the benefit of priority of each of which is claimed hereby, and each of which are hereby incorporated by reference herein in its entirety.

BACKGROUND

The following disclosure generally relates to systems and methods for previewing edited video.

A video editing application allows a user to generate an output video sequence from various video sources. A video camera can capture and encode video information in various video formats (e.g., MPEG, AVI, or DV) that can be used as video sources. A user can make edits to create a video sequence composed of desired portions of the video sources and to add effects thereto.

Some video editing applications include features allowing users to preview an output video sequence. A user may want to experiment with different types of effects, or place effects at different positions along a timeline. A user may also want to check actual colors on an NTSC display device. By using the preview feature, a temporary output video sequence can be played back immediately after generating the video sequence. But, the processing required for rendering multiple video formats and/or complex edits in substantially real time can lead to playback with unintentionally dropped frames or a lowered video quality.

Another feature that is available in some video editing applications allows rendering an output video sequence for persistent storage. In rendering, the native formats are transformed to a single output format. The rendered video can be persistently stored as a file. However, persistent rendering can require significantly more time than previewing such that repeated re-rendering is impractical during video editing.

SUMMARY

This disclosure generally describes systems and methods for previewing edited video. A proposed system can preview a video sequence in substantially real time without time-consuming and processor-intensive rendering. The proposed system can provide user control to video playback settings and take into account capabilities associated with a particular playback device to indicate to a user whether video playback at a desired level can be guaranteed or predicted to be in substantially real time. Alternatively, the proposed system can automatically adjust portions of a video sequence to at a highest possible output level (e.g., video quality or frame rate) for preview with a predictable performance.

In one aspect, a method is provided. The method comprises generating a video sequence from a plurality of video segments; identifying an inability to output at least one video segment in the video sequence in substantially real time; and adjusting an output level associated with the at least one video segment to enable the at least one video segment to be output in substantially real time.

Particular implementations can include one or more of the following features. The method can further comprise preserving an output level associated with video segments in the video sequence that are able to be output in substantially real time. The method can further comprise selecting a video quality; identifying an inability to output a particular video segment in substantially real time at the selected video quality; and adjusting a level of video quality associated with the particular video segment, the adjustment being to a highest available level that allows output of the particular video segment in substantially real time. The method can further comprise selecting a frame rate; identifying an inability to output a particular video segment in substantially real time at the selected frame rate; and adjusting a level of frame rate associated with the particular video segment, the adjustment being to a highest available level that allows output of the particular video segment in substantially real time.

The method can further comprise outputting the video sequence in substantially real time including dynamically allocating buffer sizes associated with outputting the video sequence in accordance with a frame resolution of each video segment in the video sequence. The output level can comprise at least one level selected from the group consisting of a video quality and a frame rate. The method can further comprise displaying a first indicator in a graphical display of the video segments in the video sequence, the first indicator graphically indicating video segments that are able to be output in substantially real time at a full output level; displaying a second indicator in the graphical display of the video segments in the video sequence, the second indicator graphically indicating video segments that are able to be output in substantially real time at a reduced output level; and displaying a third indicator in the graphical display of the video segments in the video sequence, the third indicator graphically indicating an inability to be output the video segments in substantially real time.

The method can further comprise calculating a cost associated with outputting each of the video segments in real time, the cost being in terms of system resources, wherein identifying the inability to output is based on the cost. The method can further comprise identifying video playback capabilities associated with system resources that are operable to output the video sequence, wherein identifying the inability to output is based on the cost. The system resources can comprise one or more resources selected from a group consisting of a processor, a memory, a graphics processor, a cache, and a bus. Generating can comprise editing a subset of the plurality of video segments to add an effect.

The method can further comprise after adjusting the output level, outputting the video sequence in substantially real time. The method can further comprise rendering the output video responsive to the inability to output the at least one video segment in substantially real time. Output in substantially real time can refer to output having consistency in the output level. Output in substantially real time can be within a predetermined level of accuracy of strict real time.

In general, in another aspect, a method is provided. The method comprises generating a video sequence from a plurality of video segments; identifying video playback capabilities associated with system resources that are operable to output the video sequence; calculating a cost associated with outputting one or more of the video segments in the video sequence in real time, the calculated cost representing a utilization level of the system resources; identifying an inability to output at least one video segment in substantially real time based on the cost; adjusting an output level associated with the at least one video segment; and outputting the video sequence in substantially real time using the adjusted output level.

Particular implementations can include one or more of the following features. The output level can comprise at least one level selected from the group consisting of a quality level and a frame rate.

In general, in another aspect, a method is provided. The method comprises generating a video sequence from a plurality of video segments; selecting an output level; identifying an inability to output at least one video segment in the video sequence in substantially real time; displaying a first indicator in a graphical display of the video segments in the video sequence, the first indicator graphically indicating video segments that are able to be output in substantially real time at a full output level; displaying a second indicator in the graphical display of the video segments in the video sequence, the second indicator graphically indicating video segments that are able to be output in substantially real time at a reduced output level; and displaying a third indicator in the graphical display of the video segments in the video sequence, the third indicator graphically indicating an inability to be output the video segments in substantially real time.

In general, in another aspect, a method is provided. The method comprises generating a video sequence from a plurality of video segments; reducing a first frame resolution associated with the at least one video segment to a second frame resolution to enable the at least one video segment to be output in substantially real time; receiving the first and second frame resolutions in association with corresponding video segments; and dynamically allocating buffer sizes associated with processing the video sequence for output, the buffer sizes configured to have a first capacity when processing a video segment at the first frame resolution and the buffer sizes configured to have a second capacity when processing a video segment at the second frame resolution.

In general, in another aspect, a computer program product tangibly stored on a computer-readable medium is provided. The computer program product comprises instructions operable to cause a computer system to perform a method, including generating a video sequence from a plurality of video segments; identifying an inability to output at least one video segment in the video sequence in substantially real time; and adjusting an output level associated with the at least one video segment to enable the at least one video segment to be output in substantially real time.

In general, in another aspect, a system is provided. The system comprises an editing timeline configurable configured to generate a video sequence from a plurality of video segments; and a preview block, in communication with the editing timeline, the preview block configurable to identify an inability to output at least one video segment in the video sequence in substantially real time, the preview block adjusting an output level associated with the at least one video segment to enable the at least one video segment to be output in substantially real time.

Particular implementations can include one or more of the following features. The system can comprise a real time engine, in communication with the editing timeline and the preview block, the real time engine configured to output the video sequence in substantially real time including dynamically allocating buffer sizes associated with outputting the video sequence in accordance with a frame resolution of each video segment in the video sequence. The output level can comprise at least one level selected from the group consisting of a video quality and a frame rate. The editing timeline can display a first indicator in a graphical display of the video segments in the video sequence, the first indicator graphically indicating video segments that are able to be output in substantially real time at a full output level, the editing timeline can display a second indicator in the graphical display of the video segments in the video sequence, the second indicator graphically indicating video segments that are able to be output in substantially real time at a reduced output level, and the editing timeline can display a third indicator in the graphical display of the video segments in the video sequence, the third indicator graphically indicating an inability to be output the video segments in substantially real time.

The preview block can comprise a cost block to calculate a cost associated with outputting each of the video segments in real time, the cost being in terms of system resources, wherein the preview block identifies the inability to output is based on the cost. The preview block can comprise a resource block to identify video playback capabilities associated with system resources that are operable to output the video sequence, wherein the preview block identifies the inability to output is based on the cost. The system resources can comprise one or more resources selected from a group consisting of a processor, a memory, a graphics processor, a cache, and a bus.

The system can comprise a rendering engine, in communication with the preview block, the rendering engine configured to render the output video sequence responsive to the inability of the preview block to output the at least one video segment in substantially real time. Output in substantially real time can refer to output having consistency in the output level. Output in substantially real time can be within a predetermined level of accuracy of strict real time.

Details of one or more implementations are set forth in the accompanying drawings and the description below. Other features and advantages may be apparent from the description and drawings, and from the claims.

DETAILED DESCRIPTION

Figure 1:
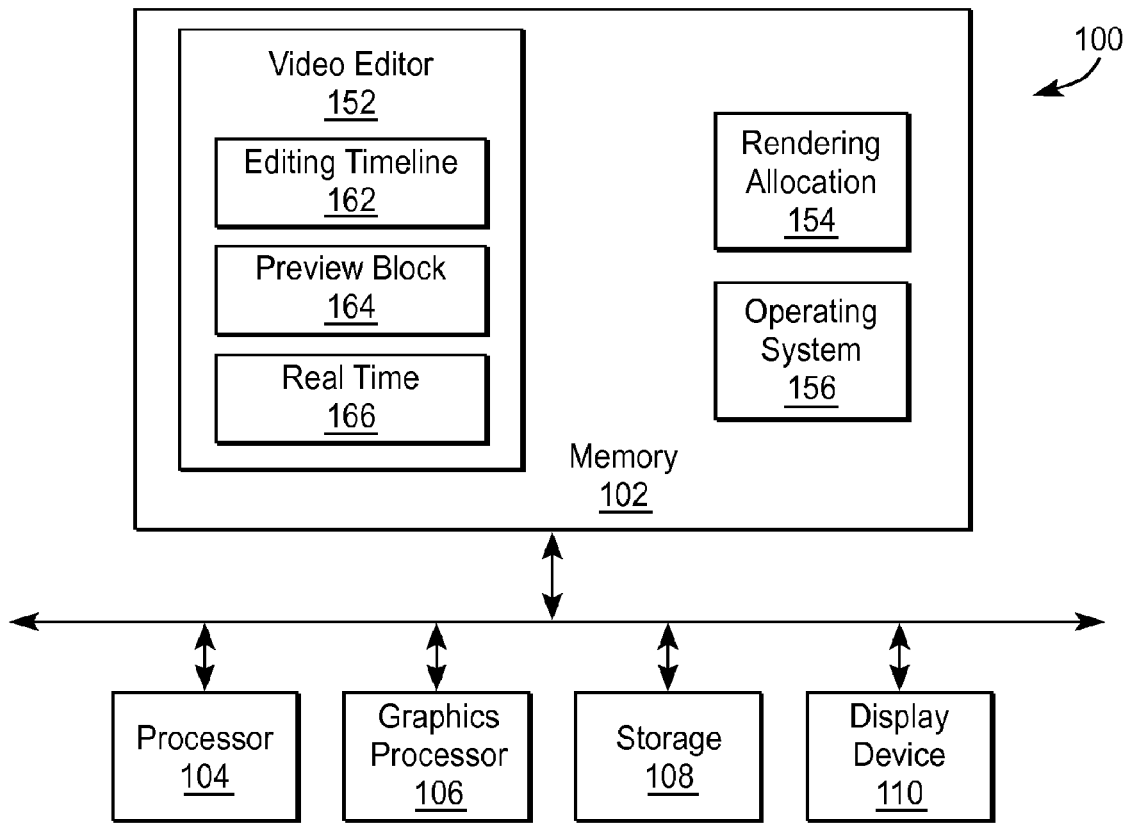
FIG. 1 is a block diagram illustrating a system for previewing edited video.

FIG. 1 is a block diagram illustrating a system 100 that can be used to playback a video sequence. The system 100 can be, for example, a personal computer, a PDA, a cellular telephone, and the like. The system 100 includes a memory 102, a processor 104, a graphics processor 106, a storage 108, and a display device 110. The memory 102 further includes a video editor 152, a rendering allocation 154 and an operating system 156. Line 199 can be a bus or other communication medium that facilitates communication between the components.

The memory 102 can be a volatile storage resource, for example, a RAM module. The memory 102 can store data and instructions associated with executing applications. The video editor 152 can be, for example, Final Cut Pro by Apple Computers of Cupertino, Calif., a nonlinear video editor, or other software that enables editing of video sources. The video editor 152 in the memory 102 further includes an editing timeline 162, a preview block 164 and a real time engine 166. The editing timeline 162, as described more fully below in association with FIG. 2, allows a user to edit various video sources into video segments and to organize the video segments into a video sequence. Edits can include, for example, cross-fades, dissolves, picture-in-picture, overlays, splices, and the like. The preview block 164, as described more fully below in association with FIG. 3, adjusts (e.g., automatically or dynamically) an output level of the video segments in the video sequence such that the video sequence can be output in substantially real time. In some implementations, substantially real time refers to producing frames such that they can be displayed at a consistent video quality (e.g., high, medium, or low) and/or frame rate (e.g., 30 frames/second or 15 frames/second). In other implementations, substantially real time has a predetermined tolerance with respect to strict real time (e.g., 3%). In one implementation, a user viewing the output video sequence will not perceive any gaps, delays, skips, or other time induced artifacts during display.

The real time engine 166 can include, for example, a media handler (not shown). The real time engine 166 provides a preview of the output video sequence by rendering the output video sequence in substantially real time. To do so, the real time engine 166 uses a pipeline architecture to schedule data retrieval, render frames, and send rendered frames to the display device 110. To render frames, the real time engine 166 decodes frames, applies effects, and composites frames. The real time engine 166 can implement several decoders depending on how many different native formats make up the output video sequence. The real time engine 166 can allocate buffers in the rendering allocation 154 dynamically, based on a desired quality of a particular video segment in the video sequence. For example, a decode buffer, an effects buffer, and a composite buffer can be allocated a different capacity on-the-fly for each video segment. In some implementations, a rendering engine (not shown) is provided to generate the output video sequence when real time is not necessary (e.g., when creating a persistent file). The rendering engine can typically produce video at a desired quality and frame rate because it can take several passes and as much time as needed in generating the output video sequence.

The rendering allocation 154 can be, for example, a portion of the memory 102 which can be further subdivided into the above-described buffers. A size of the rendering allocation 154 can be set by a request from the video editor 152 to the operating system 156. In some implementations, the rendering allocation 154 is dedicated to storing information from the video editor 152 related to previewing a video sequence. For example, the rendering allocation 154 can store a batch of video frames to be rendered, video frames being rendered, and rendered video frames to be displayed.

The operating system 156 can be, for example, OS X by Apple Computers of Cupertino, Calif., a Windows operating system, a mobile operating system, control software, and the like. In some implementations, the operating system 156 interfaces between the preview block 164 and system resources used for video playback. The operating system 156 can manage drivers for system resources that are initialized at boot up. In addition, the operating system 156 can spawn windows and initialize the video editor 152. By being in communication with both sides, the operating system 156 can send an accounting of system resources to the preview block 164 as a static measurement, or at the time of video playback.

The processor 104 can be a microprocessor such as an ARM processor, a Pentium processor, an Athlon processor, an ASIC, an FPD (Field Programmable Device), a microcontroller, and the like. The processor 104 can include local resources (not shown), for example, a level-1 cache, a level-2 cache, a floating point unit, an internal bus, and the like. In some implementations, a unified value is reported for the processor 104, and in other implementations, individual values are reported for the local resources of the processor 104. The processor 104 can execute instructions and manipulate data necessary for video playback using the local resources. In other implementations, such as in a personal computer, the processor 104 can allocate its resources for tasks that are unrelated to video playback.

The graphic processor 106 can be a microprocessor such as the processor 104, a GeForce processor, a Radeon processor, an assist processor, and the like. The graphics processor 106 can include local resources such as those described in association with processor 104. The graphics processor 106 can be dedicated to graphics processing such as executing instructions and manipulating data necessary for video playback using the local resources.

The storage 108 can be a nonvolatile memory, for example, a hard disk, a flash drive, a video tape, and the like. The storage 108 can persistently store video data used as source video for the video editor 152. The video data can be stored in various video formats such as MPEG, AVI, DV, and the like. The storage 108 can send the video data to the rendering allocation 154 during video playback. The storage 108 can also record previews of the output video sequence.

The display device 110 can be, for example, a monitor. The display device 110 provides visual representations of the playback video to a user. For example, the display device 110 can be an LCD monitor.

Figure 2:
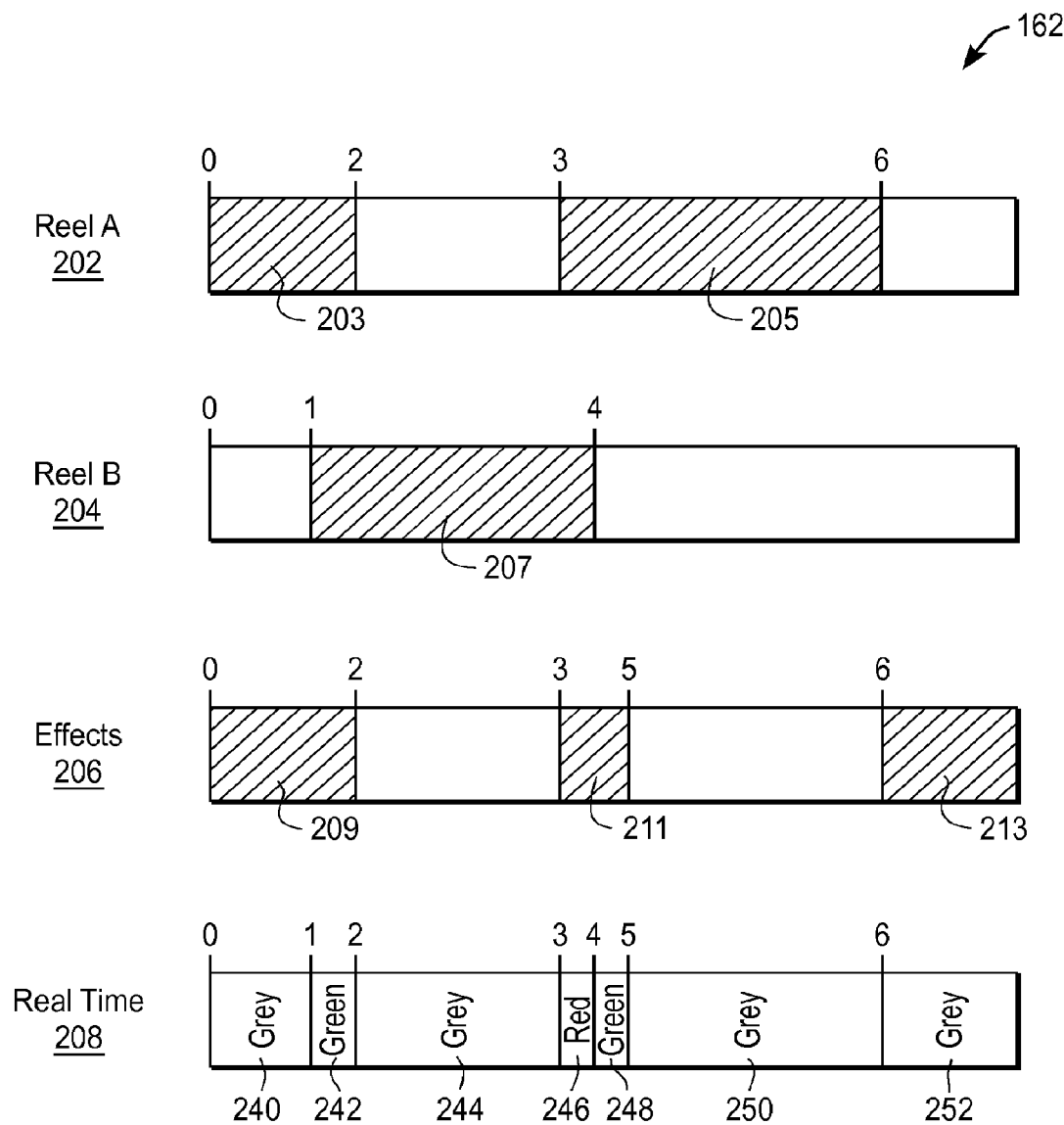
FIG. 2 is a schematic diagram illustrating an editing timeline in the system of FIG. 1.

FIG. 2 is a schematic diagram illustrating an example of the editing timeline 162. The editing timeline 162 includes a reel A 202 and a reel B 204 which together contain video segments 203,205,207. The editing timeline 162 also includes an effects timeline 206 which contains various effects 209,211, 213. During previewing, composite frames of video segments 203,205,207 and effects 209,211,213 are generated. During compositing, several sources can be evenly mixed, or sources can be layered on top of each other, to combine the several sources into a single frame. At different points in time (e.g., 0, 1, 2, 3, 4, 5 or 6), there are transitions between which sources are combined. For example, during time interval 0-1, reel A 202 and effects 209 are combined; during time interval 1-2, reels A and B 202,204 are combined; during time interval 2-3, reel B 204 is an exclusive source; and during time interval 3-4, reels A and B 202,204 and effects 206 are combined.

In addition, the editing timeline 162 includes a real time timeline 208 which contains indications 240-252 of whether corresponding portions of the video sequence can be played back in substantially real time given the available system resources. During time interval 0-1, the indication 240 is grey. The grey indication 240 can indicate that rendering the combination of video segments 203,209 is within the video output capabilities of associated system resources. During time interval 1-2, the indication 242 is green. The green indication 242 can indicate that rendering the combination of the video segments 203,207 has to be done at a lower quality or frame rate in order to provide substantially real time video playback over this portion. In another implementation, the green indication 242 is responsive to a user selection that forces playback at less than full quality. Frames in these portions of the video segments 203,207 may be poorly compressed responsive to, for example, fast action scenes or a high density of colors on the frames. During time interval 2-3, the indication 244 is grey. The grey indication 244 can indicate that the video segment 207 can be output at a full output level without the additional requirements of rendering the video segment 203 as is the case at time 2. Finally, during time interval 3-4, the indication 246 is red. The red indication 246 can indicate that rendering the combination of three different video sources is beyond available system resources at any rate. In some implementations, this portion of the video sequence is pre-rendered in a background process and, upon completion, the indication 246 can switch to grey.

Figure 3:
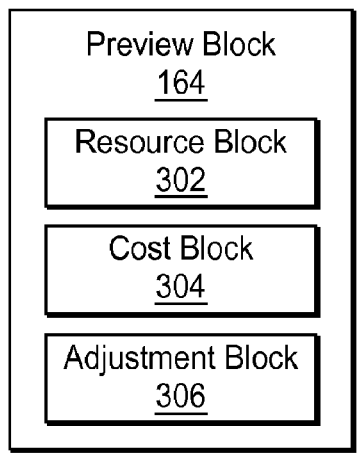
FIG. 3 is a block diagram illustrating a preview block in the system of FIG. 1.

FIG. 3 is a block diagram illustrating one implementation of the preview block 164. The preview block 164 includes a resource block 302, a cost block 304 and an adjustment block 306. At a high-level, the adjustment block 306 uses information provided by the resource block 302 and the cost block 304 to determine if any adjustments are necessary for playing back video in substantially real time.

The resource block 302 can receive resource data from the operating system 156 (FIG. 1). Also, the resource block 302 can send resource data to the cost block 304. The resource block 302 can detect availability and capacity of system resources responsive to, for example, initialization of the video editor 152, a particular resource, or the system 100. In some implementations, the resource block 302 sends queries and identifies video playback capabilities of the system 100 based on resource data received in response to the queries. The source block 302 can send the resource data as raw data, for example, a processor clock rate, a processor bus rate, a buffer size, a system bus rate, and the like. In some implementations, the source block 302 can send the resource data as unified measurement of video playback capability.

The cost block 304 can receive video sequence data from the editing timeline 162 (FIG. 1). Also, the cost block 304 can send cost data to the adjustment block 306. The cost block 304 can include a list of costs associated with various video editing operations such as a categorization of editing operations as high cost, medium cost, and low cost. The cost block 304 uses the video sequence data received to identify editing operations for particular portions of video segment in the video sequence and correlate the editing operations to the list of costs. The cost block 304 can determine costs on a per segment basis with respect to editing operations in isolation, or with respect to video playback capabilities of a particular system 100 (e.g., cost as a percentage of available system resources).

The adjustment block 306 can receive cost data and user configurations. Also, the adjustment block can send visual indications for display to a user. The adjustment block 306 can be configured through a user interface for the type of desired video playback (e.g., dynamic, high or low quality, high or low frame rate), as described below in association with FIGS. 4A-B. The adjustment block 306 can identify which of the video segments are able/unable to be played back in substantially real time according to the configurations. In some implementations, a subset of frames that are unable to be played back can cause an entire video segment or other portion thereof to be designated as unable to be played back. The adjustment block 306 can visually indicate whether each video segment can be played back as desired, for example, with a grey, a green or a red marker. In some implementations, the adjustment block 306 changes an output level associated with a particular video segment so that it can be played back in substantially real time. The output level can relate to a video quality setting, a frame rate setting, or other settings that impact the bit rate of an output signal.

Figure 4A:
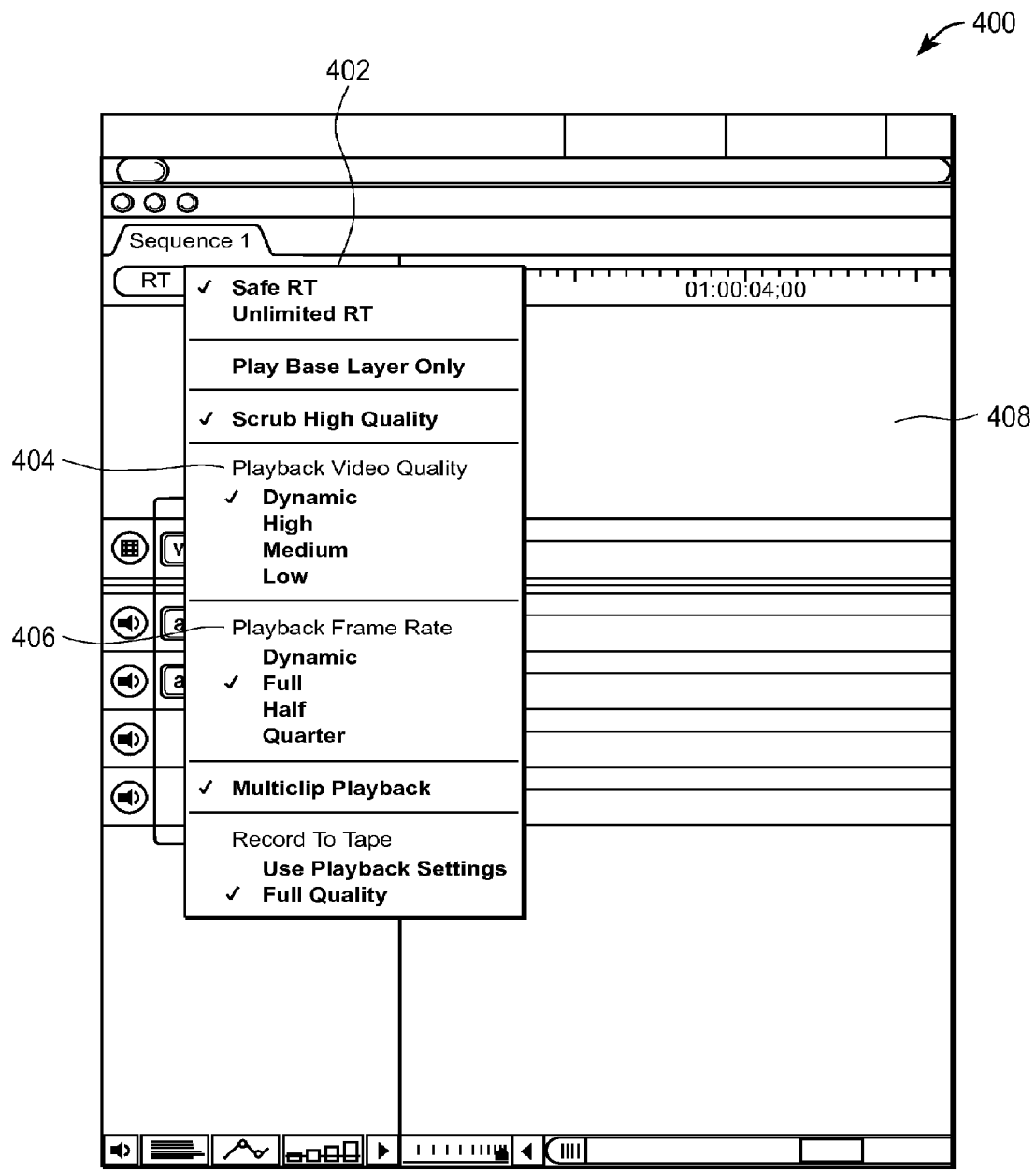
FIGS. 4A-B are schematic diagrams illustrating first and second user interfaces associated with the preview block of FIG. 3.

FIG. 4A is schematic diagram illustrating one implementation of a first user interface 400 associated with the preview block 164 (FIGS. 1 and 3). The first user interface 400 includes a window 402 that can be accessed while using a timeline 408. The window 402 has several configurations that can be set by a user. Specifically, a playback video quality setting 404 can be changed between, in the implementation shown, dynamic, high, medium, and low qualities. A playback frame rate setting 406 can be changed between, in the implementation shown, dynamic, full, half, and quarter frame rates. The playback video quality and frame rate settings 404,406 allow high level settings of video playback for low level characteristics with a mouse or a minimal amount of keystrokes. For example, a user can select a dynamic quality to automatically guarantee a highest quality of preview on a per video segment basis. This can be used to, for example, view colors or details that would be output in a persistent rendering. In another example, a user can select a dynamic frame rate to automatically guarantee a highest frame rate of preview on a per video segment basis. This can be used, for example, to view a flow of transitions that would be output in a persistent rendering.

Figure 4B:
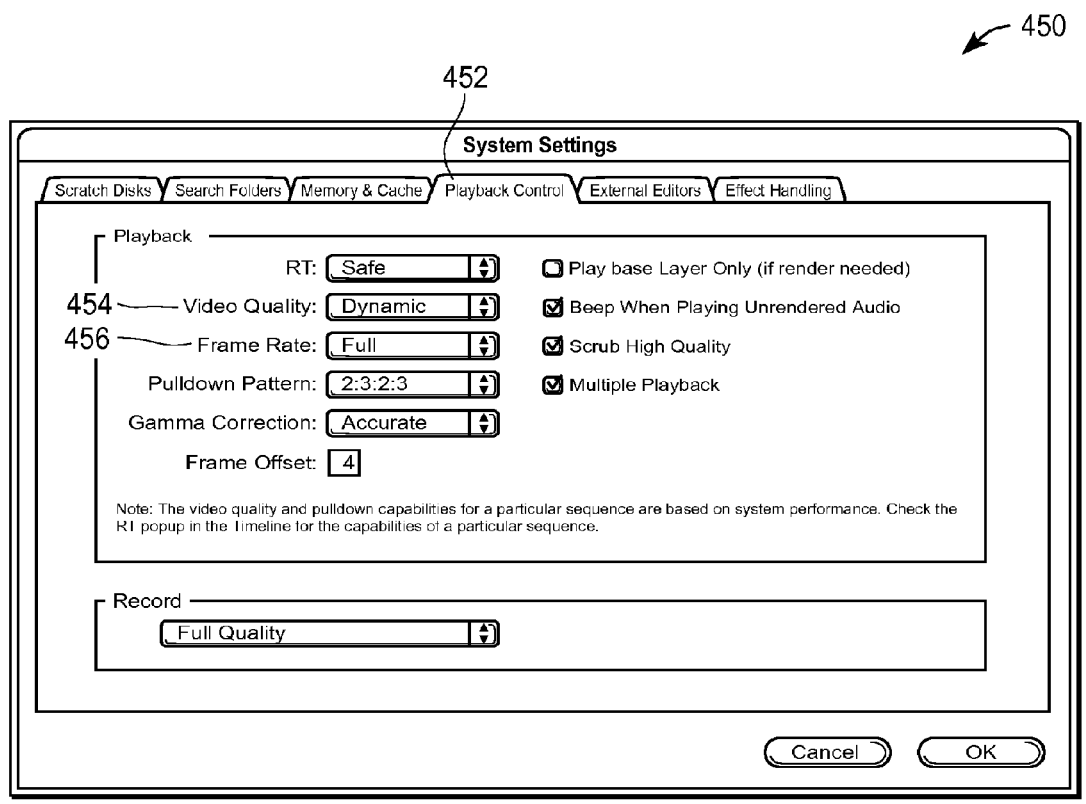

FIG. 4B is a schematic diagram illustrating one implementation of a second user interface 450 associated with the preview block 164. The second user interface 450 includes a dialog box 452 with a playback control tab selected. The second user interface 450 can be accessed from, for example, a drop down menu. Similar to FIG. 4A, the second user interface 450 includes a video quality setting 454 and a frame rate setting 456.

Figure 5:
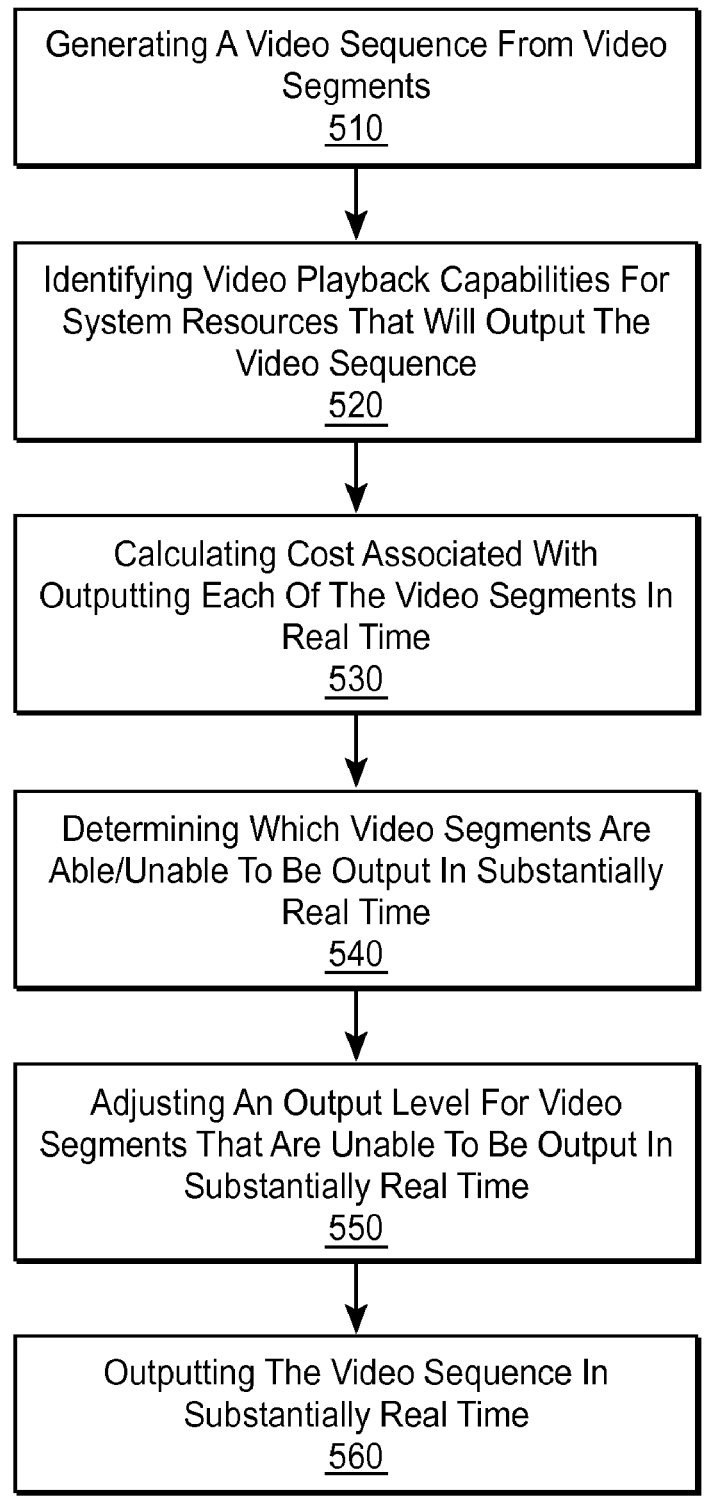
FIG. 5 is a flow diagram illustrating a method for previewing edited video.

FIG. 5 is a flow diagram illustrating a method 500 for playing back a video sequence. In general, video segments in a video sequence are adjusted to an output level that allows the video sequence to be previewed in substantially real time.

A video sequence is generated 510 from video segments (e.g., by the editing timeline 162). To do so, a user can drag and drop selected video sources into a timeline and use a trimming operation to isolate video segments from the video sources. For example, the video segments can include a roll A of wide shots and a roll B of close ups. In the example, a user can select a video segment from roll A for an opening shot, switch to a video segment from roll B to draw attention to a subject, and then switch back to a different video segment from roll A for a closing shot. A user can also add effects to or across video segments such a fade, dissolve, color correction, and the like.

Figure 6:
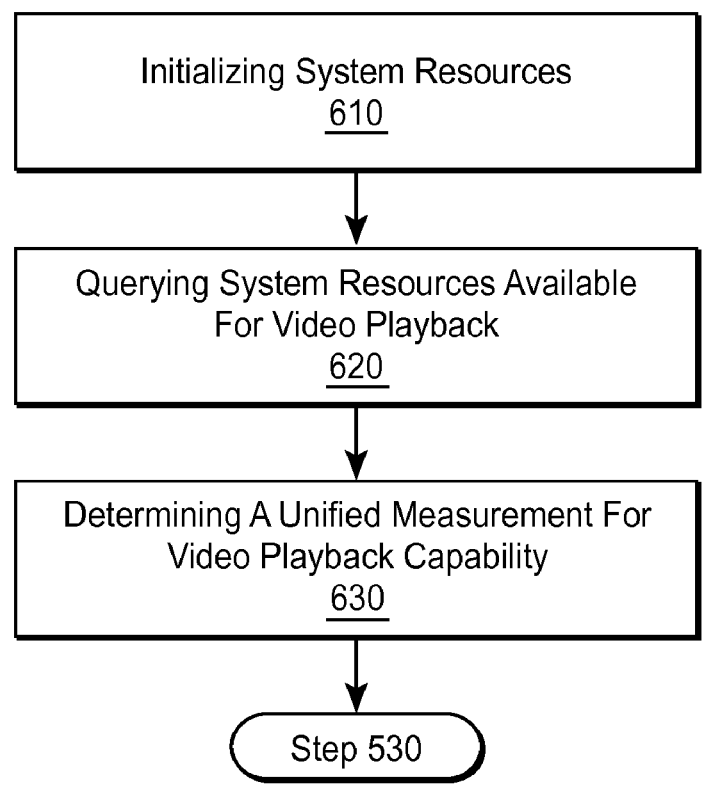
FIG. 6 is a flow diagram illustrating a method for identifying video output capabilities.

Video playback capabilities are identified 520 for system resources that will output the video sequence (e.g., by the resource block 302), as shown in detail in the flow diagram of FIG. 6. The system resources are initialized 610. At events such as power on, boot up, and the like, the system resources become available for use in video playback. A list of specific hardware and/or software can be maintained that, in some implementations, also includes a list of local resources on the hardware and/or software.

The system resources available for video playback are queried 620 (e.g., via the operating system 156). In some implementations, the list of system resources can be queried for specific capabilities. For example, a data rate or bus rate of a processor can be determined or a capacity of a memory is determined. In some implementations, the system resources are queried at any time, such as at initialization. In other implementations or situations, the system resources are queried when video playback is desired in order to get a current state of available system resources.

A unified measurement for video playback capability is determined 630. The system resources can include, for example, the rendering allocation 154 in the memory 102, the processor 104, the graphics processor 106, the storage 108, and the display device 110. In some implementations, points are accumulated for each of the system resources, and for specific capabilities of the system resources. For example, a graphics processor is an optional system resource that can significantly increase the video playback capability of a general system such as personal computer. In the example, points are assigned for the presence of the graphics processor and additionally for features such as DDR, L1 cache size, and the like. The sum is the unified measurement that provides a single measure for playback capability of the system resources.

Figure 7:
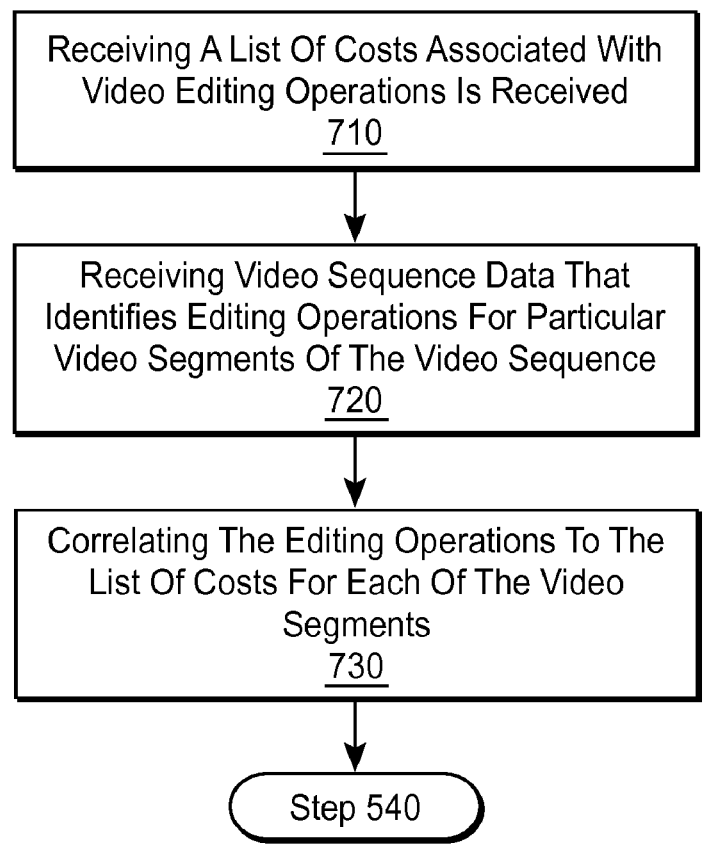
FIG. 7 is a flow diagram illustrating a method for calculating a cost for video playback of a video sequence.

As shown in FIG. 5, the cost is that is associated with outputting each of the video segments in substantially real time is calculated 530 (e.g., by the cost block 304), as shown in detail in the flow diagram of FIG. 7. A list of costs associated with video editing operations is received 710. For example, the video editing operations can be separated into categories of high cost, medium cost and low cost. High cost operations can include blur and high definition effects, middle cost operations can include motion and pan/zoom effects, and low cost operations can include color correction, cross dissolves, wipes, and text. In another example, video editing operations can have more precise costs assigned.

Video sequence data is received 720 (e.g., from the editing timeline 162). The video sequence data identifies editing operations for particular video segments of the video sequence. The video sequence data can separate the video sequence into video segments that are distinguished by video source or applied effects. Video sources can have native differences such as video format, frame rate, quality and the like that require a different amount of playback capability. The editing operations are correlated 730 to the list of costs for each of the video segments.

Figure 8:
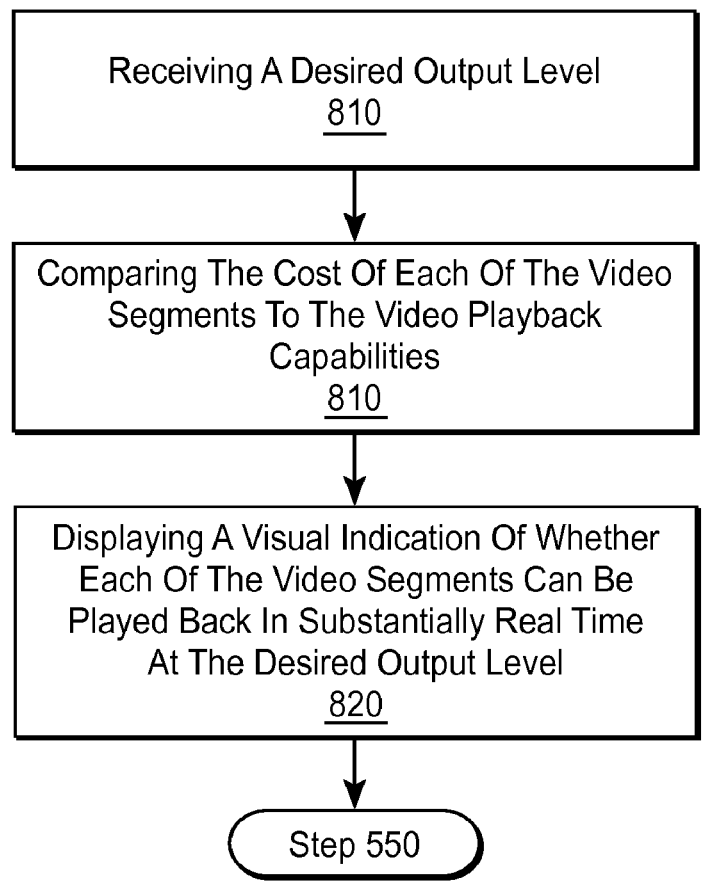
FIG. 8 is a flow diagram illustrating a method for determining which of the video segments are able/unable to be previewed in substantially real time.

As shown in FIG. 5, the video segments that are able/unable to be output in substantially real time are determined 540 (e.g., the adjustment block 306), as shown in detail in a flow diagram of FIG. 8. A desired output level can be received 810. In some implementations, a user can select a playback video quality and a playback video frame rate. When the quality is set to dynamic, each segment is played back at the highest possible quality. When a specific quality such as high is selected, each video segment is played back at the selected quality. If system resources are not able to maintain substantially real time video playback a the desired quality, the frame rate is dropped (e.g., a frame rate can drop from ⅟30 s to ⅟15 s in order to maintain a high quality). When the frame rate is set to dynamic, each segment is played back at the highest possible frame rate. When a specific frame rate such as full is selected (e.g., ⅟30 s), each video segment is played back at the full rate. If system resources are not able to maintain substantially real time video playback at the desired frame rate, the quality is dropped.

The cost of each of the video segments is compared 820 to the video playback capabilities. The video segments that have a higher cost than available system resources will not be able to be played back in substantially real time. A visual indication of whether each of the video segments can be played back in substantially real time at the desired output level is displayed 830. For example, video segments marked with grey are guaranteed to be played back in substantially real time at a desired (or full) output level, video segments marked with grey are guaranteed to be played back at a lower than desired output level, and video segments marked with red cannot be played back in real time. In one implementation, background processes begin rendering grey and red marked video segments to make them playable in real time.

Figure 9:
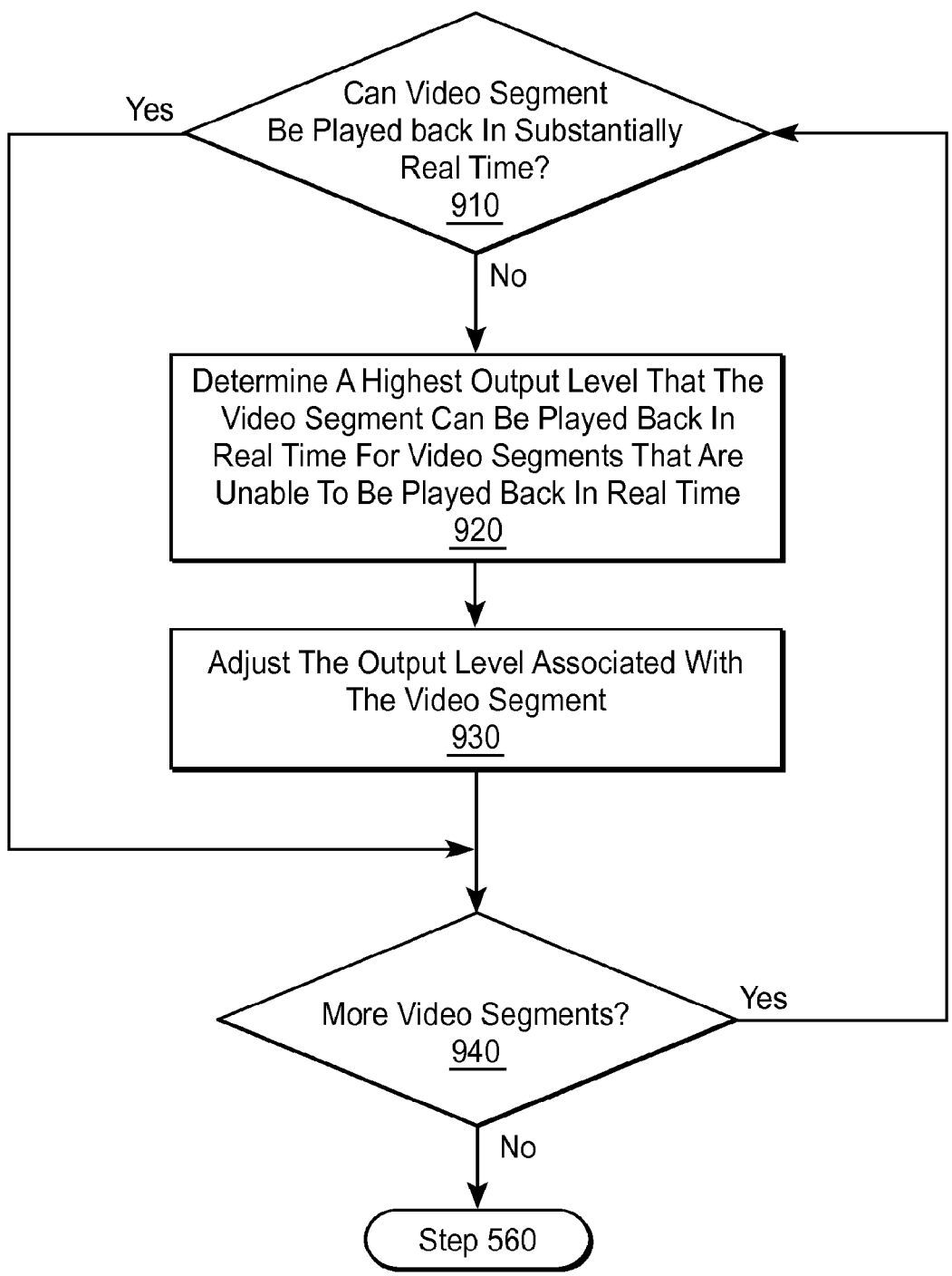
FIG. 9 is s flow diagram illustrating a method for adjusting an output level associated with the video segments.

In FIG. 5, an output level is adjusted 550 for video segments that are unable to be output in substantially real time (e.g., by the adjustment block 306), as shown in the flow diagram of FIG. 9. For video segments that cannot be played back in substantially real time 910, a highest output level is determined 920. The output level associated with video segments that are unable to be played back in substantially real time are adjusted 930 to the determined highest output level. Each of the video segments 940 is adjusted separately.

The video sequence is output 560 in substantially real time (e.g., by real time engine 166). In some implementations, the output is a preview of the video sequence that is played back using the native video source where no effects are applied. Effects are rendered in substantially real time at the determined output level. At a later point, such as when editing is complete, or when an output file is needed, the output video sequence can be rendered.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in, e.g., a computing system, a handheld device, a telephone, a consumer appliance, or any other processor-based device. A computing system implementation can include a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. In one implementation, for example, to measure a distribution of residues in a set of numbers (e.g., a set of numbers produced by a pseudorandom number generator). Accordingly, other implementations are within the scope of the following claims.

What is claimed is:

1. A computer-implemented method, the method comprising:
   generating a preview video sequence from a plurality of video segments;
   determining prior to playback, for each of the plurality of video segments in the preview video sequence, a cost associated with outputting the video segment at a specified video quality and a specified frame rate, the cost being in terms of system resources;
   identifying in conjunction with the generating the preview video segment, a first video segment in the preview video sequence that cannot be output at the specified video quality and the specified frame rate based at least in part on the determined cost; and
   dynamically adjusting at least one of video quality or video frame rate of the first video segment to enable the video segment portion of the video sequence to be output at a consistent video quality and frame rate.

2. The computer-implemented method of claim 1, further comprising:
   preserving an output level associated with plurality of video segments in the preview video sequence that are able to be output at a specified video quality and a specified frame rate associated with each of the plurality of video segments.

3. The computer-implemented method of claim 1, further comprising:
   selecting a video quality;
   identifying an inability to output a particular video segment of the preview video sequence consistently at the selected video quality; and
   adjusting a level of video quality associated with the particular video segment, the adjustment being to a highest available level of video quality that enables the particular video segment to be output consistently.

4. The computer-implemented method of claim 1, wherein generating the preview video sequence includes:
   editing a subset of the plurality of video segments to add an effect.

5. The computer-implemented method of claim 1, further comprising:
   outputting the preview video sequence at a consistent video quality and frame rate after the at least one of video quality or video frame rate of the first video segment has been adjusted.

6. The computer-implemented method of claim 5, wherein outputting the preview video sequence includes outputting the preview video sequence without any user perceivable gaps, delays, skips, or other time induced artifacts.

7. The computer-implemented method of claim 1, further comprising:
   selecting a frame rate;
   identifying an inability to output a particular video segment of the preview video sequence consistently at the selected frame rate; and
   adjusting the selected frame rate associated with the particular video segment, the adjustment being to a highest available frame rate that enables the particular video segment to be output consistently.

8. A non-transitory computer-readable medium encoded with a computer program comprising instructions that, when executed by a data processing apparatus, cause the data processing apparatus to perform operations comprising:
   generating a preview video sequence from a plurality of video segments;
   determining prior to output, for each of the plurality of video segments in the preview video sequence, a cost associated with outputting the video segment at a specified video quality and a specified frame rate, the cost being in terms of system resources;
   identifying in conjunction with the generating the preview video segment, a first video segment in the preview video sequence that cannot be output at the specified video quality and the specified frame rate based at least in part on the determined cost; and
   dynamically adjusting at least one of video quality or video frame rate of the first video segment to enable the video segment portion of the video sequence to be output at a consistent video quality and frame rate.

9. The non-transitory computer-readable medium of claim 8, further including instructions that, when executed by a data processing apparatus, cause the data processing apparatus to perform operations comprising:
   preserving an output level associated with plurality of video segments in the preview video sequence that are able to be output at a specified video quality and a specified frame rate associated with each of the plurality of video segments.

10. The non-transitory computer-readable medium of claim 8, further including instructions that, when executed by a data processing apparatus, cause the data processing apparatus to perform operations comprising:
    selecting a video quality;
    identifying an inability to output a particular video segment of the preview video sequence consistently at the selected video quality; and
    adjusting a level of video quality associated with the particular video segment, the adjustment being to a highest available level of video quality that enables the particular video segment to be output consistently.

11. The non-transitory computer-readable medium of claim 8, wherein the generating the preview video sequence includes:
    editing a subset of the plurality of video segments to add an effect.

12. The non-transitory computer-readable medium of claim 8, further including instructions that, when executed by a data processing apparatus, cause the data processing apparatus to perform an operation comprising:
    outputting the preview video sequence at a consistent video quality and frame rate after the at least one of video quality or video frame rate of the first video segment has been adjusted.

13. The non-transitory computer-readable medium of claim 12, wherein outputting the preview video sequence includes outputting the preview video sequence without any user perceivable gaps, delays, skips, or other time induced artifacts.

14. The non-transitory computer-readable medium of claim 8, further including instructions that, when executed by a data processing apparatus, cause the data processing apparatus to perform an operation comprising:
   selecting a frame rate;
   identifying an inability to output a particular video segment of the preview video sequence consistently at the selected frame rate; and
   adjusting the selected frame rate associated with the particular video segment, the adjustment being to a highest available frame rate that enables the particular video segment to be output consistently.

15. A system, comprising:
   a computer-readable medium storing a plurality of video segments included in two or more tracks; and
   a processor communicatively coupled to the computer-readable medium, the processor configured to execute:
   an editing time line to edit a video segment of the plurality of video segments and to generate a preview video sequence from the two or more tracks;
   a cost block to calculate, prior to playback, a cost associated with outputting each of the video segments included in the preview video sequence at a specified video quality and a specified frame rate, the cost being in terms of system resources; and
   a preview block, in communication with the editing timeline, the preview block to identify in conjunction with the generation of the preview video sequence, at least one video segment in the preview video sequence that cannot be at the specified video quality and the specified frame rate based at least in part on the determined cost, the preview block dynamically adjusting at least one of video quality or video frame rate of each individual identified video segment to enable the at least one identified video segment to be output at a consistent video quality and frame rate.

16. The system of claim 15, the processor further configured to execute:
   a real time engine, in communication with the editing timeline and the preview block, the real time engine to output the preview video sequence in substantially real time, including dynamically allocating a size of one or more buffers associated with outputting the preview video sequence.

17. The system of claim 16, wherein the real time engine is further to allocate the size of the one or more buffers in accordance with a frame resolution of a current video segment in the preview video sequence.

18. The system of claim 15, the processor further configured to execute:
   a rendering engine, in communication with the preview block, the rendering engine configured to render an output preview video sequence responsive to the inability of the preview block to output each video segment included in the preview video sequence at the specified video quality and the specified frame rate.

19. The system of claim 15, wherein the preview block is to preserve an output level associated with plurality of video segments in the preview video sequence that are able to be output at a specified video quality and a specified frame rate associated with each of the plurality of video segments.

20. The system of claim 15, wherein the preview block is to output the preview video sequence at a consistent video quality and frame rate after the at least one of video quality or video frame rate of the first video segment has been adjusted.

* * * * *